United States Patent Office 2,918,838
Patented Dec. 29, 1959

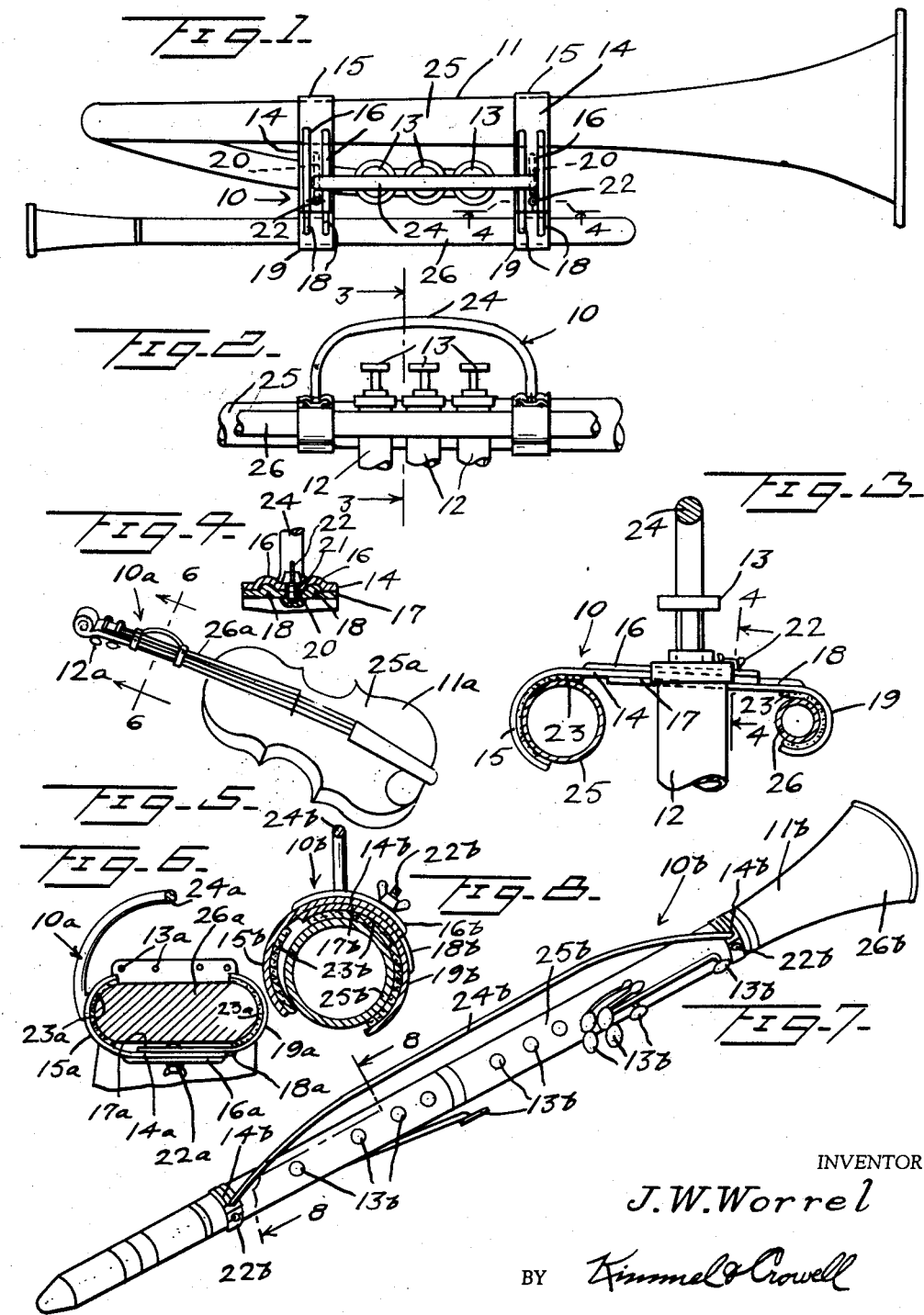

2,918,838

FINGER GUIDE FOR MUSICAL INSTRUMENTS

John W. Worrel, Lexington, Ky.

Application August 28, 1957, Serial No. 680,811

1 Claim. (Cl. 84—465)

The present invention relates to finger guides for musical instruments, and particularly to finger guides for musical instruments in which movement of the fingers assists in forming the notes.

The primary object of the invention is to provide a finger guide for musical instruments which will keep the fingers in close proximity to their playing position.

In teaching the playing of musical instruments, teachers have found that the student players tend to move the fingers so far from the playing position between notes that it is difficult for them to return the fingers to the correct notes when playing the next note. The present invention prevents the fingers from being moved away from the playing position to any great extent so that the fingers are correctly positioned when the next note is to be played.

A further object of the invention is to provide a finger guide for musical instruments which is readily detachable from the instrument to permit its normal use by a competent musician.

A still further object of the invention is to provide a finger guide of the class described above which is inexpensive to manufacture, simple to use, and which is completely effective in its operation.

Other objects and advantages will become apparent in the following specification when considered in the light of the attached drawings, in which:

Figure 1 is a top plan view of the invention shown attached to a trumpet.

Figure 2 is a fragmentary side elevation of the invention illustrated in Figure 1.

Figure 3 is an enlarged fragmentary transverse cross-section taken along the line 3—3 of Figure 2, looking in the direction of the arrows.

Figure 4 is an enlarged fragmentary longitudinal section taken along the lines 4—4 of Figures 1 and 3, looking in the direction of the arrows.

Figure 5 is a perspective view of a violin showing a modified form of the invention attached thereto.

Figure 6 is an enlarged fragmentary transverse cross-section taken along the line 6—6 of Figure 5, looking in the direction of the arrows.

Figure 7 is a perspective view of a clarinet showing another modified form of the invention attached thereto.

Figure 8 is an enlarged fragmentary transverse cross-section taken along the line 8—8 of Figure 7, looking in the direction of the arrows.

Referring now to the drawings in detail wherein like reference characters indicate like parts throughout the several figures, and considering first, Figures 1 through 4, the reference numeral 10 indicates generally a finger guide constructed in accordance with the invention.

The finger guide 10 is illustrated in Figures 1 through 4 as attached to a trumpet 11, the notes of which are partially controlled by valves 12 by means of actuator push buttons 13.

The trumpet 11 is of conventional design and forms no part of the present invention.

The finger guide 10 includes a pair of flat bars 14 arranged in spaced parallel relation and each having a semi-circular hooked end 15 formed integrally therewith. Each of the flat bars 14 have spaced parallel longitudinally extending corrugations 16 formed therein, as can be best seen in Figures 3 and 4.

A second flat bar 17 is positioned under each of the flat bars 14 and is provided with spaced parallel corrugations 18 cooperating with the corrugations 16, as illustrated in Figure 4.

The flat plates 17 are each provided with a semi-circular hooked end 19 integrally formed thereon and positioned oppositely of the hooked end 15 of the bar 14.

The bar 17 is provided with an elongated slot 20 and the bar 14 is provided with an aperture 21 through which extends a bolt and wing nut 22 for adjustably securing the bar 14 to the bar 17. The inner surface of each of the semi-circular hooked end portions 15 and 19 have adhesively secured thereto a soft cloth pad 23 for engagement with the trumpet 11.

An arched loop 24 formed of metallic material in the form of a rod has its opposite end portions secured to the bars 14 with the loop 24 overlying the push buttons 13, as best illustrated in Figures 1 and 3.

In the use and operation of the invention, the wing nuts and bolts 22 are loosened and the hooked end portions 15 and 19 of the device are separated so that they may be engaged over adjacent conduit portions 25 and 26 of the trumpet 11. The hooked end portions 15 and 19 are then moved into clamping engagement with the conduit portions 25 and 26 and the wing nuts and bolts 22 are tightened to secure the finger guide 10 to the trumpet 11.

The trumpet 11 is played in the ordinary manner by playing the fingers on the push buttons 13 and the overlying arched loop 24 guides the fingers to prevent them from being moved too far away from the push buttons 13.

Referring now to Figures 5 and 6, a modified form of the invention is illustrated wherein a finger guide 10a is attached to a violin 11a.

The violin 11a is of conventional design having a chest 25a and a neck 26a extending therefrom. A plurality of strings 13a extend from the chest 25a along the neck 26a to the pegs 12a on the neck 26a.

The finger guide 10a includes a pair of spaced parallel flat bars 14a each having an integral semi-circular hooked end portion 15a formed on one end thereof and a pair of spaced parallel longitudinally extending corrugations 16a formed therein.

A second elongated flat bar 17a is provided with a pair of corrugation 18a cooperating with the corrugations 16a and has an integral semi-circular hooked end portion 19a formed on the end thereof opposite the hooked end portion 15a. A wing nut and bolt 22a extends through the bars 14a and 17a securing them together for longitudinal adjustment.

The hooked end portions 15a and 19a are each provided with cloth pads 23a adhesively secured to the inner surface thereof to protect the neck 26a of the violin 11a which is engaged therebetween.

An arched loop 24a has its opposite end portions secured to the hooked ends 15a and extends therefrom to overlie the strings 13a, as can be best seen in Figure 6, to prevent the fingers of the player from being moved too far from the strings 13a.

In the use and operation of the modification illustrated in Figures 5 and 6, the finger guide 10a is clamped to the neck 26a by engaging the hooked ends 15a and 19a on opposite sides of the neck 26a and tightening the wing nut and bolt 22a, securing the bars 14a and 17a together in adjusted position. The corrugations 16a and 18a interfit to hold the bars 14a and 17a in alignment as well as provide reinforcement therefor. The loop 24a overlies the strings 13a so that the fingers of the player will be maintained in close proximity to the strings 13a.

Referring now to Figures 7 and 8, another modified form of the invention is illustrated wherein a finger guide 10b is attached to a clarinet 11b. The clarinet 11b is of conventional design and includes a plurality of keys 13b by means of which the notes of the clarinet are controlled. The clarinet 11b includes an elongated hollow generally cylindrical body 25b having a bell 26b at one end thereof.

The finger guide 10b includes an arcuate bar 14b having a hooked end portion 15b formed integrally on one end thereof. The arcuate bar 14b has spaced parallel corrugations 16b formed thereon. A second arcuate bar 17b is provided with spaced corrugations 18b coorperating with the corrugations 16b with the arcuate bar 17b underlying the arcuate bar 14b.

A hooked end portion 19b is integrally formed on the arcuate bar 17b oppositely of the hooked end portion 15b on the arcuate bar 14b. A wing nut and bolt 22b secures the arcuate bars 14b and 17b together for adjustment relative to each other. The hooked end portions 15b and 19b as well as the arcuate bar 17b have cloth pads 23b adhesively secured to the inner surface thereof for protecting the body 25b of the clarinet 11b when the finger guide 10b is attached thereto.

An elongated arched loop 24b is positioned in overlying relation with respect to the keys 13b and has its opposite end portions secured to the arcuate bars 14b by welding or the like.

In the use and operation of the finger guide 10b, as illustrated in Figures 7 and 8, the arcuate bars 14b and 17b are separated by removing the wing nut and bolt 22b, and are reassembled in position to encircle the body 25b of the clarinet 11b, as illustrated in Figure 8. The loop 24b maintains the fingers of the player of the clarinet 11b in close proximity to the keys 13b so that lost motion in reaching the right key 13b is prevented.

While I have illustrated three modifications of the invention, providing a finger guide for trumpets, violins, and clarinets, it should be understood that numerous other modifications may be resorted to, to adapt the instant invention to other instruments and to instruments of different sizes, without departing from the scope of the appended claim.

What is claimed is:

A finger guide for musical instruments comprising an elongated inverted generally U-shaped rod arranged to overlie the fingering area of a music instrument, a clamp rigidly secured to each end of said rod with each of said clamps including a pair of bars, interengaging corrugations formed in each of said bars, an integral arcuate outer hooked end portion formed on each of said bars, a fabric pad adhesively secured to the inner surface of each of said hooked end portions, and means adjustably securing said bars together with their corrugations interfitting and with the hooked end portions releasably clamped to a musical instrument.

References Cited in the file of this patent
UNITED STATES PATENTS

| | | |
|---|---|---|
| 752,996 | Nissenson | Feb. 23, 1904 |
| 1,245,632 | Straub | Nov. 6, 1917 |
| 1,692,185 | Paine et al. | Nov. 20, 1928 |
| 2,208,860 | Smart | July 23, 1940 |
| 2,556,535 | Hansen | June 12, 1951 |